United States Patent [19]

Morgenfruh et al.

[11] 4,300,158
[45] Nov. 10, 1981

[54] PROCESS CONTROL APPARATUS

[75] Inventors: Rudolph A. Morgenfruh, Huntington Station; William W. Burnham, Mineola, both of N.Y.

[73] Assignee: Hazeltine Corporation, Greenlawn, N.Y.

[21] Appl. No.: 47,663

[22] Filed: Jun. 11, 1979

Related U.S. Application Data

[63] Continuation of Ser. No. 816,631, Jul. 18, 1977, abandoned.

[51] Int. Cl.³ .............................................. H04N 1/46
[52] U.S. Cl. ..................................................... 358/80
[58] Field of Search ............................ 358/80, 78, 75

[56] References Cited

U.S. PATENT DOCUMENTS

3,877,068  4/1975  Kosaka et al. ........................ 358/80
4,037,249  7/1977  Pugsley ................................. 358/80

*Primary Examiner*—Richard Murray
*Attorney, Agent, or Firm*—Edward A. Onders; Frank R. Agovino

[57] ABSTRACT

An apparatus for controlling a process machine, in accordance with control settings determined using a process simulating apparatus, makes use of a recorder associated with the simulating apparatus to record signals representative of the position of control elements on the simulating apparatus. The recorded signals are read and used to automatically set the controls of the process machine. The device is advantageously used in connection with a color scanner and a color previewer having a set of control elements corresponding to the control elements on the scanner.

21 Claims, 7 Drawing Figures

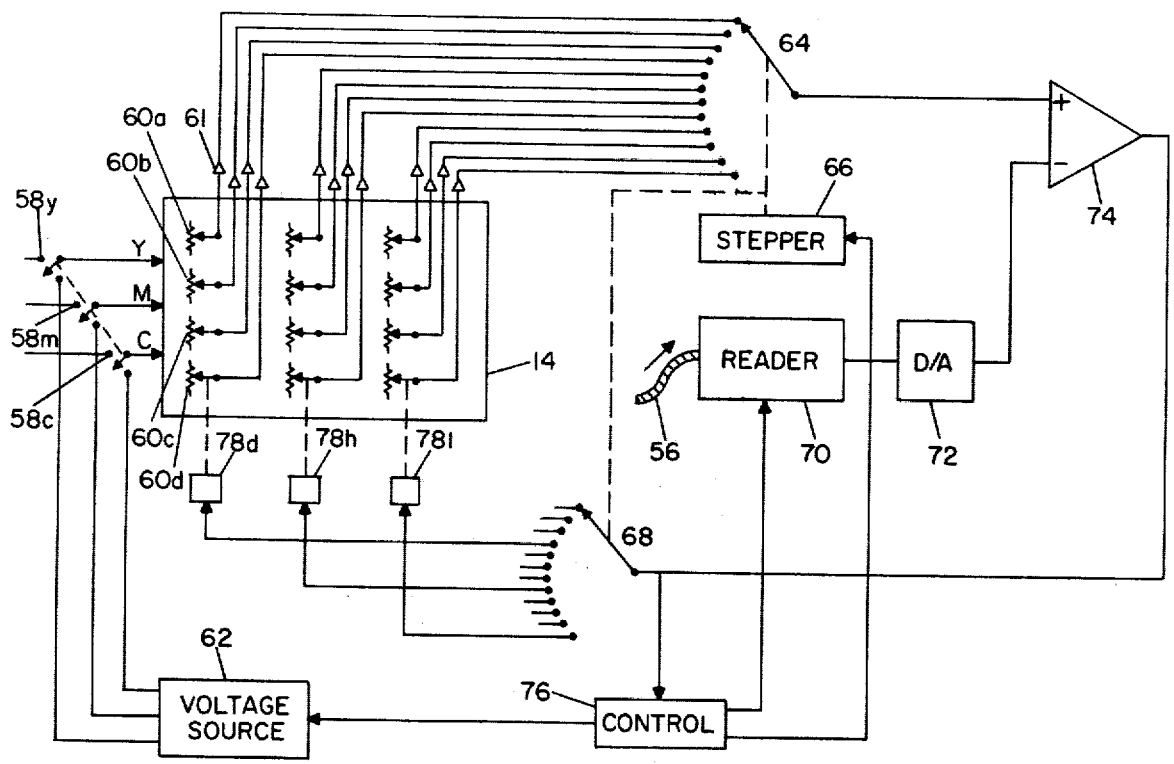
FIG. 4
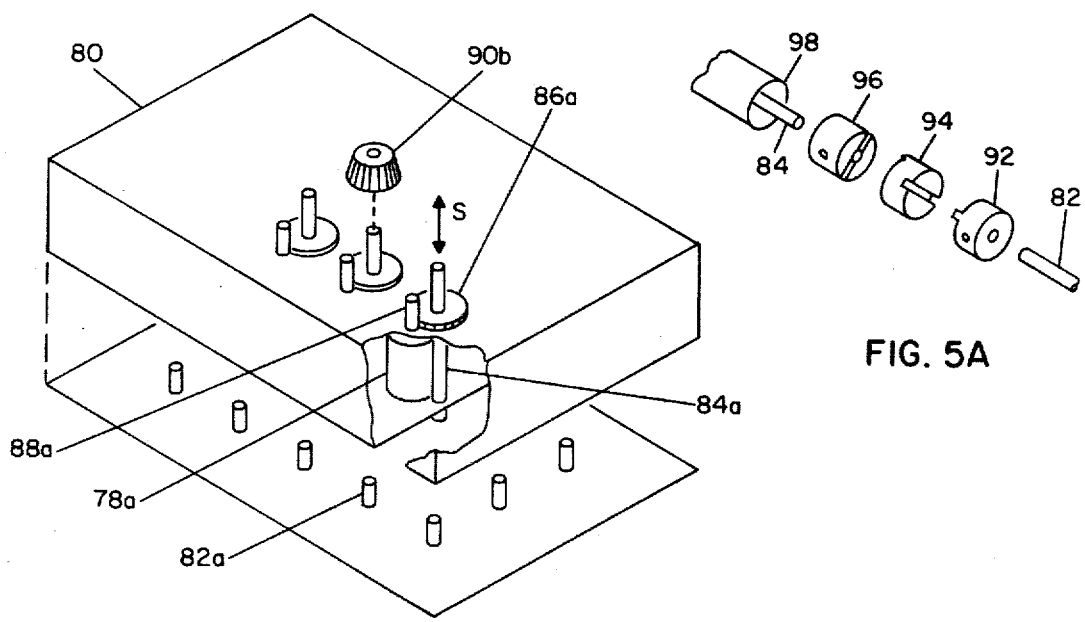
FIG. 5A
FIG. 5

PROCESS CONTROL APPARATUS

This is a continuation of application Ser. No. 816,631 filed July 18, 1977 now abandoned.

BACKGROUND OF THE INVENTION

This invention relates to apparatus for transferring the setting of process control elements from a process simulating apparatus to a process machine. In particular, the invention is useful in connection with a system for previewing the operation of a color scanner and for transferring the control element settings from the previewer system to the scanner.

FIG. 1 illustrates the process typically used for the manufacture of color prints. This process employs a color scanner 12 comprising units 11, 13, 14 and 16. The color original 10, which may be a photographic print or color transparency is mounted to a rotating drum 11. A light detector 13 detects the component color content of the image 10 as various segments of the image are sequentially scanned, by rotating drum 11 and by moving detector 13 across image 10 in a direction corresponding to the axis of drum 11. The output of detector 13 is in the form of video signal representative of the amplitude of the various color components in sequentially scanned portions of image 10 which are provided to color correction computer 14. These signals are usually representative of the yellow, magenta, and cyan color content of image 10 and are represented in FIG. 1 by the letters Y, M, and C. Color correction computer 14 is equipped with circuits for enhancing, correcting and cross-correlating the component color signals and is connected to exposure apparatus 16 which provides a set of color separations. Usually four separations are made, each separation is a black and white transparent image representative of a single color component in the original image. Where four separations are provided they are usually representative of the yellow, magenta, cyan, and black components of the image. The color separations are used in the etching of printing plates or cylinders 20. One cylinder or plate is made corresponding to each of the four separations and separations and the plates are used with corresponding colored inks to sequentially print the component color images on paper, to result in a composite color image having all of the component colors.

Color correction computer 14 is provided with many control elements for changing the characteristics of the color separations manufactured by the scanner 12. FIG. 6 illustrates the control panel of a typical prior art color correction computer. It should be noted that the control panel contains 89 different control elements including switches and potentiometers. The control elements are arranged in an order corresponding to the four color separations which the scanner manufactures and the various controls, where applicable, are indicated Y, M, C, and B as a prefix to the control number. Control numbers unrelated to a particular separation are labeled S for switches, and R for potentiometers. The single meter has the prefix D.

With the large number of controls available on a typical color scanner, the quality of the separations produced is largely dependent upon the skill of the scanner operator. Based on the operator's evaluation of the color original, it is necessary for him to make adjustments to the control panel in a manner which he feels will produce separations which will make an acceptable color print in the actual printing process. After a first set of separations has been made, it is necessary to manufacture printing cylinders or plates and actually apply ink to paper to determine whether the operator's judgment is correct. If the resulting print does not satisfy the operator or editor, it is necessary for the operator to adjust the control panel of the color scanner and repeat the process making new separations and printing plates. Alternatively, the color separations or printing plates might be modified by etching or other processes.

In order to facilitate the production of color prints, there have been developed color printing previewing apparatus which simulate the operation of the color scanner, including the color correcting computer. One such previewing apparatus 23 is illustrated in FIG. 2 wherein the color original 10 is scanned by a video signal generating apparatus 24 which may be a color TV camera or similar device. Video signal generator 24 produces video signals representative of the elementary colors in image 10 and provides them to a color correction computer 26 which is similar or identical to the color correction computer 14 used in the scanner of FIG. 1. The output of the color correction computer 26 consists of video signals representative of the color separations 18 used in the actual printing process. These are supplied to a printing simulator computer 28 which modifies the video signals in accordance with the characteristics of the particular printing process being used. The output signal from printing simulator 28 are provided to a color display unit 30 which provides a color display image representative of the resulting color print which would be produced using a printing process with the color correction computer control elements set in accordance with the setting of the control elements of computer 26.

An operator using the previewing apparatus 23 can adjust the color correction control elements while viewing display 30 and arrive at a set of control settings which when applied to the actual color correction computer 14 of the color scanner 12 will result in an acceptable set of color separations which will produce the desired qualities in the color print 22. As noted above, both the color correction computer 14 and its simulator 26 may have on the order of ninety control elements. It is both tedious and time consuming for an operator to manually adjust each of the control elements of the color correction computer 14 in the color scanner 12 in accordance with the readings of the corresponding control elements on the previewer 23.

It is therefore an object of the invention to provide a practical, accurate, and inexpensive apparatus for transferring the control element settings from a process simulating apparatus to a process machine.

It is a further object of the invention to provide such an apparatus wherein the process simulating apparatus may be used separately from the process machine and the control settings transferred at the convenience of the operator of the process machine.

SUMMARY OF THE INVENTION

In accordance with the invention, there is provided an apparatus for use in conjunction with a process machine having a plurality of adjustable process control elements which act on process signals to vary at least one characteristic of the signals and thereby vary the process. The apparatus includes a process simulating apparatus, operative on supplied simulation signals and having adjustable simulation control elements corresponding to the process control elements. The simulating apparatus includes indicating means for providing a representation of the actual process results in accordance with the settings of the simulation control elements. There is also provided reading means for providing a sequence of control position signals, each representative of the electrical output of one of the simulation control elements when predetermined simulation signals are applied to the simulation apparatus. Finally, there are provided process machine control operating means, sequentially responsive to each of the control position signals and the electrical output of each of the process control elements when the predetermined simulation signals are supplied to the process machine. The control operating means adjusts the condition of the process control elements.

The reading means preferably includes means for recording the control position signals. In this case, the control operating means is provided with means responsive to the recorded signals. The process control elements of the process machine may be mechanically operated, in which case the control operating means includes motors mechanically connected to each of the process control elements. The reading means may include means for providing a sequence of the simulation signals to the simulation apparatus, a selected signal during the time that each of the control elements is read to provide a control position signal. The control position signals are preferably converted from analog-to-digital form and stored on a storage medium, such as a magnetic or punch tape. The invention is most advantageously applied in connection with a color scanning process in which a graphic arts previewing apparatus comprises the simulating apparatus.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 4 is a schematic and block diagram illustrating an apparatus for adjusting the position of control elements in accordance with recorded signals.

FIG. 5 illustrates a control element operating mechanism in accordance with the present invention.

FIG. 5A is a detailed view of the control element connection in the apparatus of FIG. 5.

DESCRIPTION OF THE INVENTION

Figure 1:
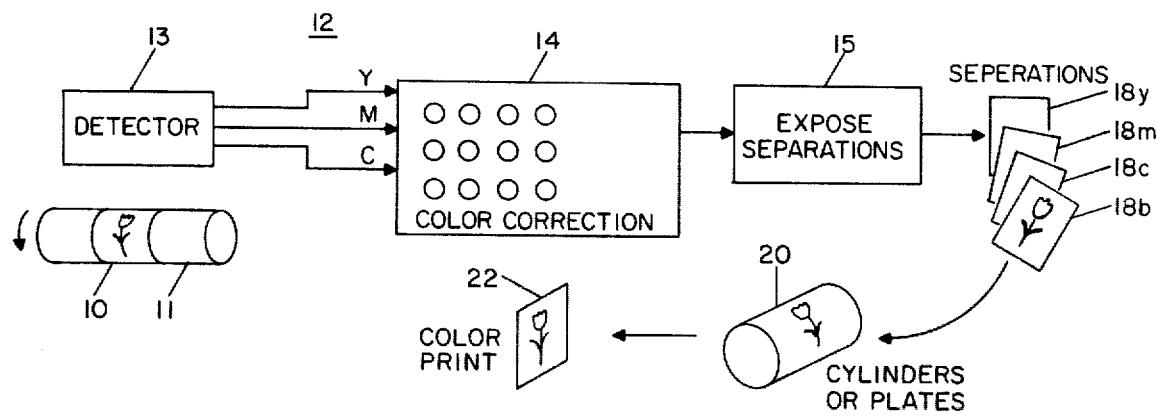
FIG. 1 is a diagram illustrating a color printing process using a color scanner.
Figure 2:
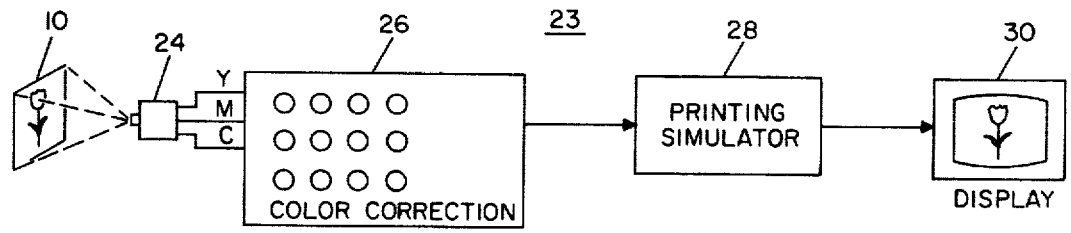
FIG. 2 is a block diagram of a graphic arts previewing system.
Figure 3:
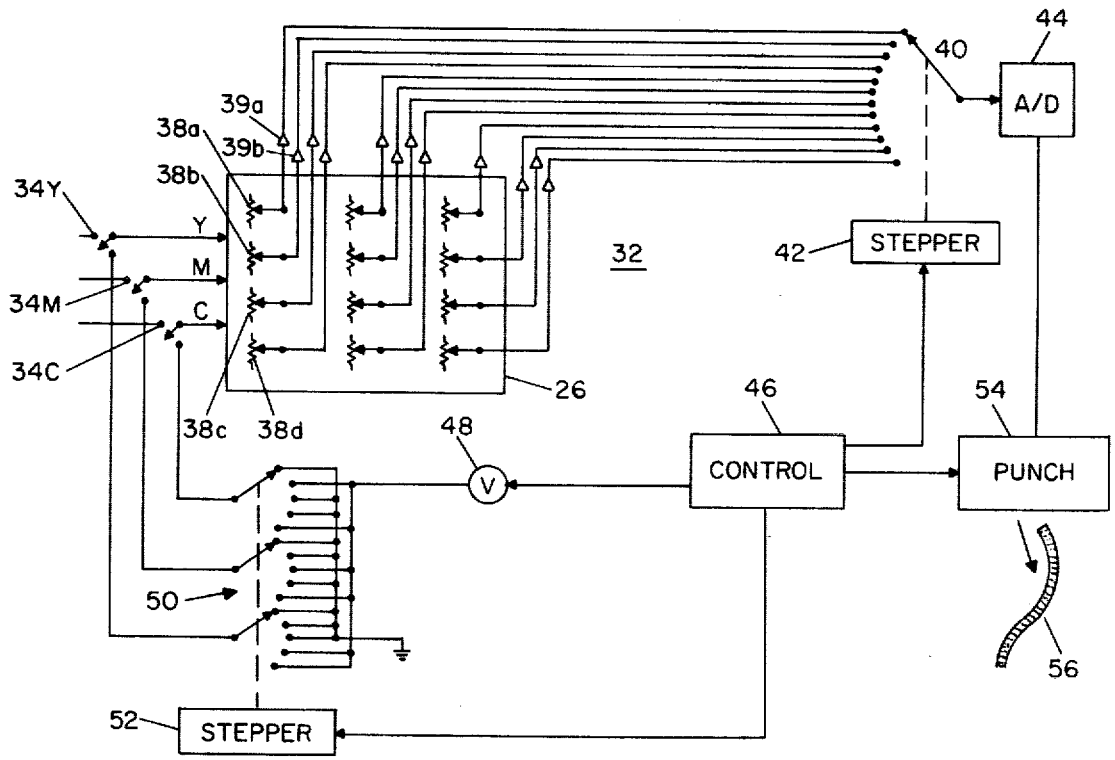
FIG. 3 is a schematic and block diagram illustrating an apparatus for reading and recording the control positions of a simulating system.

FIG. 3 is a schematic and block diagram illustrating the principle components of the invention as used in connection with the graphic arts previewing apparatus 23 of FIG. 2. The input lines to the color correction computer 26 contain video signals representative of the yellow, magenta, and cyan components of the original image 10 as it is scanned by the video signal generating apparatus 24. These video signals are coupled to a matrix of potentiometers 38a, 38b, 38c, etc., which comprise the control elements of the color correction computer. Potentiometers 38 are connected together in a matrix which provides for adjustment of the amplitude of each of the video signals and provides for the intermixing of the video signals in order to generate signals suitable for the manufacture of color separations. Potentiometers 38 are designed to be substantially identical to the corresponding control element in the color correction computer 14 of the color scanner with which the graphic arts previewing apparatus is to be used. Each of the outputs of the wipers of potentiometers 38, in addition to its interconnection in computer 26, is also connected to multi-throw switch 40 by one of the buffer amplifiers 39. Switch 40 is operated by stepper 42 in accordance with control signals from control unit 46. The output of switch 40 is connected to A to D converter 44 which generates a digital signal representative of the amplitude of the voltage at the wiper of the potentiometer which is connected to A to D converter 44 through switch 40. In order to have a meaningful reading of the position of potentiometers 38, there is provided a signal generating apparatus which consists of multi-pole, multi-throw, switch 50 and voltage generating circuit 48. When the position of control elements 38 is to be read, input switches 34 of the video signal inputs are connected to switch 50. Voltage generating circuit 48 and switch 50 are used to supply a predetermined set of voltages to the video signal input switches 34 of color correction computer 36. The voltages supplied are selected in accordance with the control element 38 being read. Switch 50 is operated by stepper motor 52 under the influence of control unit 46. The units 40 through 54 comprise potentiometer setting recorder 32 in FIG. 3.

In accordance with the invention, the input terminals of color computer 26 are provided with signals which will place a suitable voltage across the potentiometer to be read, which is independent of the settings of the remaining potentiometers which have not been read. For example, if all of the video signal inputs are grounded to provide zero input video signal voltage, certain of the potentiometers 38 will have a suitable applied voltage and this voltage will not be dependent on the settings of the other potentiometers. These particular potentiometers may then be read by switch 40 and A to D converter 44. The wiper voltage of the potentiometer is converted into a digital signal which is provided to tape punch 54 and recorded on an output paper tape 56. Each of the potentiometers is read in a predetermined sequence. When all of the potentiometers which are to be read with all zero input voltages have been read, stepper 52 operates switch 50 to change the input voltages provided to input switch 34.

The operation of switch 50 provides a second voltage set to input switches 34, which provides a suitable voltage at other potentiometers 38, which have not yet been read. The voltage across each of the second set of potentiometers should be dependent only upon the supplied voltage and the settings of potentiometers which have previously been read. This condition is necessary because the stored control position signals on the punch tape will be used in the same sequence for setting the controls of a color scanner. Control unit 46 provides control signals to voltage generator 48, stepper motors 42 and 52, and tape punch 54. This provides a sequence of operations in which a given set of signals is supplied at the input switch 34 of the color computer, selected ones of the potentiometers are read for the voltage at their wiper contacts, and the readings are converted to digital form and stored on output tape 56 by tape punch 54. This sequence is followed using different input voltage combinations for selected one of the potentiometers 38 until all of the potentiometers have been read. The tape 56 then contains a complete set of the potentiometer settings in color computer 26 and may be removed from the potentiometer setting recorder 32 for use in a color scanner at a later time.

FIG. 4 is a schematic and block diagram illustrating apparatus for using tape 56 to set the controls of a color scanner. As previously mentioned, the color computer 14 of a color scanner includes a plurality of potentiometers 60a, 60b, 60c, etc., each corresponding to one of the potentiometers 38 in the graphic arts previewing apparatus. The color computer 14 also has a set of input video signal terminals having switches 58, each corresponding to one of the component colors of yellow, magenta and cyan. A voltage source 62, which is programmed by control unit 76, provides a set of input signals to input switches 58, which correspond to the signals supplied to switches 34 of color computer 36. A multi-throw switch 64 is connected to the wiper output of each of potentiometer control elements 60 of color computer 14 by an isolation amplifier. Switch 64 sequentially connects each of the potentiometer outputs to differential amplifier 74.

Punch tape reader 70 is provided with the tape 56 made by the tape punch 54 of the FIG. 3 apparatus and provides an output digital signal corresponding to the control position signals stored on tape 56, one for each of the potentiometers in the color computer. The control position signals are converted from digital-to-analog form in D to A converter 72 and supplied to differential amplifier 74. The output of differential amplifier 74 is connected to one of the motors 78 associated with potentiometers 60 by multi-throw switch 68. Motors 78 are mechanically coupled to the control rod of potentiometers 60 and are used to sequentially drive the potentiometers to a position in which their output signal is equal to the output of D to A converter 72.

The apparatus of FIG. 4 operates to adjust the position of the control elements of color computer 14 in a color scanner by the following sequence. Control unit 76 provides a signal to voltage source 62 which causes the source to provide a selected set of predetermined simulation voltages to input switches 58 of color computer 14. Control unit 76 activates stepper motor 66 to move multi-throw switches 64 and 68 to the positions corresponding to the wiper and motor respectively of the first of the control element potentiometers 60 in accordance with the same sequence used in the FIG. 3 apparatus. In addition, control unit 76 causes reader 70 to read the first stored digital control position signal on punch tape 56 corresponding to the desired position of the first potentiometer 60. The digital control position signal is converted to analog form by D to A converter 72 and supplied to differential amplifier 74 along with the actual wiper voltage of the first potentiometer 60. If the voltages at the input of differential amplifier 76 are different, there results a control signal which is supplied to the motor mechanically coupled to the first potentiometer which rotates the potentiometer shaft until the signals are equal. When the two signals are equal, the output of differential amplifier 74 drops to zero. This condition is sensed by control unit 76 which activates the control unit to cause voltage source 62, reader 70, and stepper motor 66 to move to the next sequential position.

Figure 6:
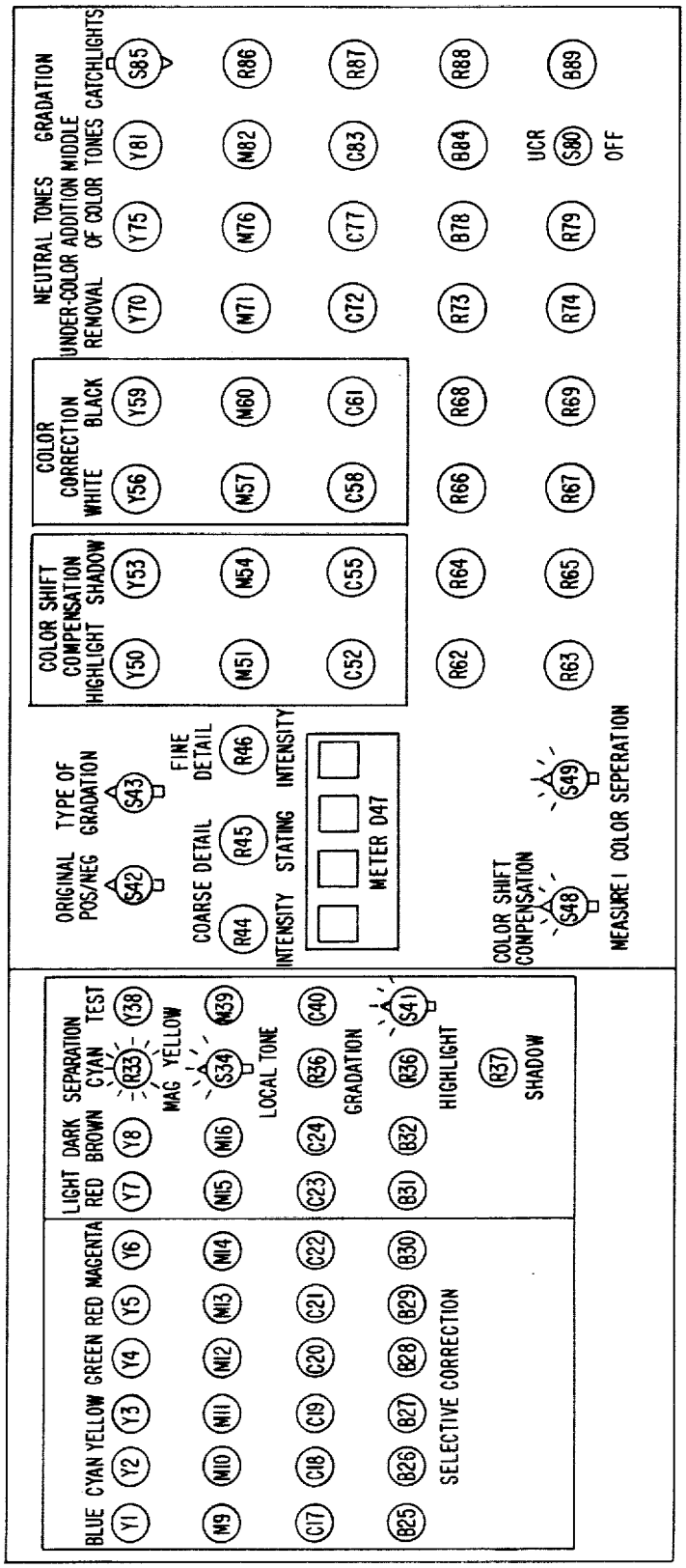
FIG. 6 is a view of the control panel of a color scanner usable in the FIG. 1 process.

The detailed structure and operation of the invention may be understood by reference to its implementation in connection with a particular piece of equipment, such as the color scanner whose control panel is illustrated in FIG. 6. In order to obtain motor driven operation of the control elements of the scanner control panel, a device such as illustrated in FIG. 5 may be used. The FIG. 5 device includes a chassis 80 within which there are mounted drive motors 78 corresponding to the control elements of the scanner. The scanner control knobs have been removed from their respective shafts on the scanner leaving protruding shaft ends 82 projecting from the control panel. Chassis 80 includes a plurality of shafts 84 each corresponding to one of the control element shafts 82. Gears 86 are mounted shafts 84 and mate with corresponding gears 88 mounted to drive motors 78 which are connected to the circuit shown in FIG. 4. For convenience of installation, shafts 84 are mounted to chassis 80 such that they will move between two axial positions in the direction indicated by the arrow S. The control knobs 90 which have been removed from their shafts 82 on the scanner control panel may be mounted to the ends of shafts 84 which protrude from chassis 80. Shafts 84 are connected to shafts 82 preferably by the coupling illustrated in the exploded view of FIG. 5A. Coupling elements 92 and 96, which have protruding sections, are fixedly mounted on shafts 82 and 84 respectively. A central coupling element 94 is provided which has transverse grooves corresponding to the protruding sections on parts 92 and 96 such that when the shafts with their corresponding coupling elements are brought into contact with coupling element 94, the protruding sections on parts 92 and 96 engage the respective grooves on coupling element 94. A sleeve 98 surrounds the entire coupling mechanism in order to prevent coupling element 94 from slipping off either part 92 or 96 prior to engagement. This type of coupling is useful for making the blind connection between shafts 84 and 82 when chassis 80 is placed in position over the control panel of the scanner. Each of shafts 84 is initially moved to its axial position away from shaft 82. Therefore, the corresponding connecting part 96 attached to shaft 84 is disengaged from central coupling part 94. This permits the mounting of chassis 80 to the control panel of the scanner without interference from the shaft connections. Each of shafts 84 may then be individually rotated while being urged into its downward position along arrow S, and when the projecting part of mating piece 96 engages the groove in central part 94, the shaft 84 may be moved to its lowermost position in which case the two shafts are rotationally coupled together. Control knobs 90 are attached to projecting shafts 86 and permit manual operation of the scanner control elements in the same manner as prior to the control unit installation.

The sequence of operation for the reading of control position settings on a graphic arts previewer and the sequence for setting the control elements of a color scanner are exemplified by the following table which indicates a sequence having 69 steps, each corresponding to a selected one of the 89 control elements on the scanner control panel illustrated in FIG. 6. Not all of the control elements are automatically set, since some of the control elements consist of multi-position switches which may be easily set and other control elements can be easily set by manual positioning. It has been found to be convenient to use three drive chassis 80 of the type illustrated in FIG. 5 for setting the controls of the color scanner illustrated in FIG. 6. A first drive chassis is used to control the 32 potentiometers on the left of the control panel. A second drive chassis is used to control the potentiometers labeled Y-50 through R-69 and third drive chassis is used to set potentiometers Y-70 through B-89. The switches and potentiometers grouped in the center of the control panel are set manually be the operator. Many of these are adjusted only in the event of a change in the type of original image or a change in the type of printing process. As noted above, for convenience in identification, the control elements in the FIG. 6 control panel have been given letter prefixes Y, M, C, and B for the colors yellow, magenta, cyan, and black, which are indicated by the color of the control knob on the color scanner. Control elements which consist of potentiometers which do not have any color significance are labeled with the prefix R and switches have the prefix S. The single meter of the control panel has a prefix D.

TABLE

| Sequence No. | Input Voltages | | | Control Element No. |
|---|---|---|---|---|
| | Y | M | C | |
| 1 | 0 | 0 | 0 | R 69 |
| 2 | 0 | 0 | 0 | Y 53 |
| 3 | 0 | 0 | 0 | M 54 |
| 4 | 0 | 0 | 0 | C 55 |
| 5 | 0 | 0 | 0 | R 65 |
| 6 | 0 | 0 | 0 | R 67 |
| 7 | 0 | 0 | 0 | R 68 |
| 8 | 0 | 0 | 0 | B 31 |
| 9 | 0 | 0 | 0 | R 73 |
| 10 | 0 | 0 | 0 | R 87 |
| 11 | 0 | 0 | 0 | B 63 |
| 12 | 10 | 0 | 0 | Y 50 |
| 13 | 10 | 0 | 0 | Y 1 |
| 14 | 10 | 0 | 0 | M 9 |
| 15 | 10 | 0 | 0 | C 17 |
| 16 | 10 | 0 | 0 | B 25 |
| 17 | 10 | 0 | 0 | Y 56 |
| 18 | 10 | 0 | 0 | R 62 |
| 19 | 10 | 0 | 0 | B 32 |
| 20 | 10 | 0 | 0 | R 79 |
| 21 | 0 | 10 | 0 | M 51 |
| 22 | 0 | 10 | 0 | Y 2 |
| 23 | 0 | 10 | 0 | M 10 |
| 24 | 0 | 10 | 0 | C 18 |
| 25 | 0 | 10 | 0 | B 26 |
| 26 | 0 | 10 | 0 | M 57 |
| 27 | 0 | 10 | 0 | Y 59 |
| 28 | 0 | 10 | 0 | C 61 |
| 29 | 0 | 10 | 0 | Y 3 |
| 30 | 0 | 10 | 0 | M 11 |
| 31 | 0 | 10 | 0 | C 19 |
| 32 | 0 | 10 | 0 | B 27 |
| 33 | 0 | 0 | 10 | C 52 |
| 34 | 0 | 0 | 10 | Y 6 |
| 35 | 0 | 0 | 10 | M 14 |
| 36 | 0 | 0 | 10 | C 22 |
| 37 | 0 | 0 | 10 | B 30 |
| 38 | 0 | 0 | 10 | C 58 |
| 39 | 0 | 0 | 10 | M 60 |
| 40 | 0 | 6 | 10 | Y 4 |
| 41 | 0 | 6 | 10 | M 12 |
| 42 | 0 | 6 | 10 | C 20 |
| 43 | 0 | 6 | 10 | B 28 |
| 44 | 0 | .07 | 10 | Y 5 |
| 45 | 0 | .07 | 10 | M 13 |
| 46 | 0 | .07 | 10 | C 21 |
| 47 | 0 | .07 | 10 | B 29 |
| 48 | 0 | .08 | .32 | Y 7 |
| 49 | 0 | .08 | .32 | M 15 |
| 50 | 0 | .08 | .32 | C 23 |
| 51 | 0 | .07 | .31 | Y 8 |
| 52 | 0 | .07 | .31 | M 16 |
| 53 | 0 | .07 | .31 | C 24 |
| 54 | 10 | 10 | 10 | Y 81 |
| 55 | 10 | 10 | 10 | M 82 |
| 56 | 10 | 10 | 10 | C 83 |

TABLE-continued

| Sequence No. | Input Voltages | | | Control Element No. |
|---|---|---|---|---|
| | Y | M | C | |
| 57 | 10 | 10 | 10 | B 84 |
| 58 | 10 | 10 | 10 | B 89 |
| 59 | 10 | 10 | 10 | R 86 |
| 60 | 10 | 10 | 10 | R 88 |
| 61 | 10 | 10 | 10 | R 64 |
| 62 | 0 | 0 | 0 | Y 75 |
| 63 | 0 | 0 | 0 | Y 70 |
| 64 | 0 | 0 | 0 | M 76 |
| 65 | 0 | 0 | 0 | M 71 |
| 66 | 0 | 0 | 0 | C 77 |
| 67 | 0 | 0 | 0 | C 72 |
| 68 | 0 | 0 | 0 | B 78 |
| 69 | 10 | 10 | 10 | R 66 |

The above table sets forth a sequence for reading the control elements of a graphic arts previewing apparatus and setting the control elements of a typical color scanner, such as Hell Chromograph DC 300 scanner. In accordance with the sequence, after the graphic arts previewing apparatus has been adjusted so that the display depicts an acceptable color print, the system is activated to automatically readout the settings of the control elements on the graphic arts previewing apparatus and record those settings on a paper tape or other storage device. The sequence set out above is by no means unique, but has been selected for convenience and for providing a small number of different sets of input voltages and so that the control elements of the color scanner are set in an order in which the voltage applied to any particular control element is not dependent on the setting of a control element which has not yet been set.

Control unit 46 of the FIG. 2 apparatus initiates the sequence by giving a command to the voltage generating apparatus 48 and multi-pole switch 50, which causes the switch to be set to supply zero input voltage at all of the input switches 34. At the same time, stepper 42 is activated such that switch 40 connects control element R 69 of the graphic arts previewer to A to D converter 44. An additional control signal causes the punch unit 54 to record the voltage output of control element R 69 on paper tape 56. When this has been accomplished, control unit 46 activates stepper 42 to move switch 40 and connect control element Y 53 to A to D converter 44, for the second step of the control element reading sequence. After step No. 11 of the sequence, control unit 46 provides a control signal to stepper 52 and voltage source 48, which causes an input voltage of 10 volts to be applied to the yellow video signal input terminal while the remaining video signal input terminals remain grounded. The control unit then activates the process of reading the control element outputs in the sequence indicated by the table. When the output signals from all the control elements in the sequence have been read, the paper tape may be detached from the paper tape punch and transferred to the color scanner along with the original image 10 for use by the scanner operator in making color separations.

It is an important feature of the invention that the color scanner can be operated independent of the graphic arts previewer, and the operation of the two machines for any particular original need not be coordinated in time. The original image and output tape from the graphic arts previewer can be stored until time is available on the color scanner for producing separations from the corresponding original. In order to set up the color scanner control elements, the scanner operator inserts punched tape 56 into tape reader 70 and activates control unit 76 to initiate the tape reading and control setting cycle. This cycle follows the same sequence, set forth in the table above, according to which the signal outputs from the control elements of the graphic arts previewer were read. In the control setting cycle control unit 76 causes voltage source 62 to supply the first set of input voltages, all inputs zero volts, to input switches 58 of the color computer. Tape reader 70 then reads the digital signal representative of the output voltage of control element No. R 69 which is stored on tape 56 and supplies it to D to A converter 72 which generates a reference voltage. Stepping motor 66 operates switches 64 and 68 to connect the output terminal of Control No. R 69 on the color scanner to differential amplifier 74, and simultaneously connect the output of differential amplifier 74 to the motor 78 connected to control element R 69. Differential amplifier 74 provides an output signal to switch 68 and motor 78 connected to control element R 69, which causes motor 78 to turn, varying the position of control element R 69 unitl its output signal is equal to the stored output signal derived from tape 56 which is supplied to the other terminal of differential amplifier 74. When the two signals supplied to the differential amplifier 74 are equal, the output of the differential amplifier approaches zero volts, a condition sensed by control unit 76 which activates reader 70 to read the stored position signal corresponding to the next control element, control Y 53, and supply a new reference signal in analog form to differential amplifier 74, while stepper switch 66 connects the output of control element Y 53 and the motor corresponding to control element Y 53 to differential amplifier 74. This process is repeated until all the control elements of the color scanner which are motorized have been set. At appropriate points in the sequence, the control unit 76 supplies a control signal to voltage source 62 which causes source 62 to change the input voltages supplied to input switches 58. It has been noted above that not all of the control elements of the color scanner need be motorized. Those controls which are not motorized may be manually sent by recording their positions when the image is previewed on the graphic arts previewer and by having the operator of the color scanner adjust the position of these controls where necessary or appropriate. In many cases, the control positions need not be changed from one image to the next.

It will be evident to those familiar with the art that the apparatus of the invention may be applied to systems other than color scanners and graphic arts previewers. In general, the system is applicable for use with a process machine having variable control elements and with a process simulation apparatus having corresponding control elements. Similar electronic devices may simulate chemical processes, such as photography, or mechanical or electrical processes, such as the manufacture of tape recordings or phonograph records.

It will also be evident to those familiar with the electronic art that components other than those illustrated may be advantageously used in a device in accordance with the invention. The invention as illustrated makes use of multi-throw and/or multi-pole stepping switches. Those familiar with digital circuitry will recognize that such switches may easily be replaced with solid state multiplex circuits which perform the switching function in accordance with digital control signals. Similarly, the tape punch apparatus as described above may be replaced with any similar storage device, such as a magnetic tape, disk recorder, or card punch. It is also possible, and practical in some cases, to implement the invention without the use of a storage medium by directly connecting the output of switch 40, which is connected to the control element of the process simulating apparatus to one of the poles of differential amplifier 74. The use of a storage medium, such as tape 56, facilitates separate and independent use of the process simulation apparatus, such as a graphic arts previewer, and the process machine, such as the color scanner.

The invention may also be applied to system which use control elements other than potentiometers. The control elements used in a system may include variable capacitors, or inductors, or even variable gain amplifiers. In such applications it may be necessary to use different or more complex test signals in the control element reading and setting operation. In some cases, for example, it may be necessary to make use of single frequency tone signals or the like for setting the control elements. In these cases, the characteristic output of control elements may be something other than the voltage at the output of the elements. Accordingly, different detector and test signal generator circuits would be appropriate.

While there have been described what are believed to be the preferred embodiments of the invention, those skilled in the art will recognize that other and further modifications may be made thereto without departing from the spirit of the invention, and it is intended to claim all such embodiments as fall within the true scope of the invention.

We claim:

1. Apparatus, for use in connection with a process machine having a plurality of adjustable process control elements which act on process signals to vary at least one characteristic of the signals and thereby vary the process, comprising:
    a process simulating apparatus operative on supplied simulation signals and having adjustable simulation control elements corresponding to said process control elements, said simulating apparatus having indicating means for providing a representation of the actual process result in accordance with the settings of said simulation control elements;
    means for supplying predetermined simulation signals to said process machine;
    reading means for providing a sequence of control position signals, each representative of the electrical output of one of said simulation control elements when said predetermined simulation signals are supplied to said simulation apparatus;
    and process machine control operating means, sequentially responsive to each of said control position signals and the electrical output of each of said process control elements when said predetermined simulation signals are supplied to said process machine, for adjusting the condition of said process control elements.

2. Apparatus as specified in claim 1 wherein said reading means includes means for recording said control position signals and wherein said control operating means includes means responsive to said recorded signals.

3. Apparatus as specified in claim 1 wherein said process control elements are mechanically operated controls, and wherein said operating means includes a plurality of motors mechanically connected to said control elements.

4. Apparatus as specified in claim 1 wherein said reading means includes means for providing a sequence of said predetermined simulation signals to said simulating apparatus and wherein said control position signals are each representative of the output of one of said simulation control elements when a selected one of said predetermined simulation signals is provided to said simulation apparatus.

5. Apparatus as specified in claim 4 wherein said process control operating means includes means for providing said sequence of predetermined simulation signals to said process machine.

6. Apparatus as specified in claim 1 wherein said reading means comprises:
   signal generating means for providing a sequence of predetermined simulation signals;
   sampling means for sampling the output of said control elements and providing said control position signals;
   recording means for providing a machine readable representation of said control position signals;
   and reader control means for controlling the operation of said signal generator, said sampling means and said recording means.

7. Apparatus as specified in claim 6 wherein said control operating means comprises:
   signal generator means for providing a sequence of said predetermined simulation signals;
   sampling means for sampling the output of said process control elements;
   detecting means for reading said machine readable representation of said control position signals;
   operating means for operating said process control elements in response to the output of said sampling means and said detecting means;
   and operator control means for controlling the operation of said signal generator means, said sampling means, said detecting means, and said operating means.

8. Apparatus for use in connection with a color scanner having a plurality of adjustable scanner control elements for acting upon color representative video signals to vary the video signal characteristics and thereby vary the color separations produced by the scanner, comprising:
   a graphics art previewing apparatus, operative on supplied color representative video signals and having adjustable previewer control elements corresponding to said scanner control elements, said previewing apparatus including a display unit for displaying a simulation of a color print made from separations produced by a scanner set in accordance with the settings of said previewer control elements;
   means for supplying predetermined voltages to the video signal input of said scanner;
   reading means for providing a sequence of control position signals, each representative of the electrical output of one of said previewer control elements when said predetermined voltages are supplied to the video signal input of said previewing apparatus;
   and scanner control operating means, sequentially responsive to each of said control position signals and to the electrical output of each of said process control elements when said predetermined voltages are supplied to the video signal input of said scanner, for adjusting the condition of said scanner control elements.

9. A simulating apparatus, for use in connection with a process machine having a plurality of adjustable process control elements which act on process signals to vary at least one characteristic of said process signals and thereby vary the process, comprising:
   means for supplying simulation signals representative of said process signals;
   a plurality of adjustable simulation control elements for modifying said simulation signals, each corresponding to one of said process control elements;
   indicating means, responsive to said modified simulation signals, for providing a representation of the actual process result in accordance with the settings of said simulation control elements;
   means for supplying predetermined simulation signals to said simulation apparatus;
   reading means for providing a sequence of control position signals, each representative of the electrical output of one of said simulation control elements when said predetermined simulation signals are supplied to said simulation apparatus;
   and recording means for providing a machine readable representation of said control position signals.

10. Apparatus as specified in claim 9 wherein said reading means includes means for providing a digital signal representative of said electrical output.

11. Apparatus as specified in claim 9 wherein there are provided means for sequentially connecting said reading means to each of said simulation control elements.

12. A graphic arts previewing apparatus, for use in connection with a color scanner having a plurality of adjustable scanner control elements for acting upon color representative video signals to vary the video signal characteristics and thereby vary the color separations produced by the scanner, comprising:
   a video signal generating apparatus, responsive to a color image, for providing a set of color representative simulation video signals, corresponding to the video signals in said scanner;
   a color correction computer having a plurality of simulation control elements, each corresponding to one of said scanner control elements, for acting upon said simulation video signals to vary the video signal characteristics, thereby to produce signals representative of color separations;
   a printing simulator, responsive to said color separation simulation signals, for acting upon said separation signals to produce video signals representative of a color print to be produced by an actual printing process.
   display means, responsive to the output of said printing simulator, for displaying an image representative of a color print;
   means for supplying predetermined voltages to the video signal input of said color correction computer;
   reading means for providing a sequence of control position signals, each representative of the electrical output of one of said previewer control elements when said predetermined voltages are supplied to the video signal input of said color correction computer;

and means, responsive to said control position signals for providing a machine readable representation of said control position signals.

13. A control operating apparatus, for use in connection with a process machine having a plurality of adjustable process control elements which act on process signals to vary at least one characteristic of the signals and thereby vary the process, comprising:
- means for supplying a predetermined set of process signals to said process machine;
- detecting means, responsive to an encoded storage media, for providing a sequence of reference signals representative of desired control element output signals when said predetermined set of process signals are applied to said process machine;
- sampling means for providing a sequence of control element signals, each representative of the output of one of said control elements;
- operating means, responsive to said reference signals and said control element signals, for sequentially varying each of said control elements until said control element signals are equal to said reference signals;
- and control means for controlling the operation of said detecting means, said signal generator, said sampling means and said operating means.

14. A control operating apparatus as specified in claim 13 wherein said sampling means comprise means for sequentially connecting each of said process control elements to said operating means.

15. A control operating apparatus as specified in claim 13 wherein said operating means includes a differential amplifier, responsive to said reference signals and said control element signals for providing a motor operating signal, and motors for adjusting the position of said process control elements.

16. A control operating apparatus as specified in claim 15 wherein said operating means further includes means for sequentially connecting each of said motors to the output of said differential amplifier.

17. A control operating apparatus as specified in claim 13 wherein said operating means includes a plurality of motors, each mechanically connected to one of said process control elements.

18. A control operating apparatus as specified in claim 17 wherein said motors are mounted to a chassis, adapted for mounting to said process machine, and wherein there are provided means for mechanically connecting said motors to said process control elements.

19. A control operating apparatus as specified in claim 13 wherein said means for supplying is comprised of a signal generator.

20. Apparatus for operating control elements of a color scanner in accordance with control position signals encoded on a storage medium, comprising:
- means for providing a predetermined set of simulated video signals to said scanner;
- detecting means, responsive to said encoded position signals, for providing a sequence of reference signals representative of desired scanner control element output signals when said predetermined set of simulated video signals are applied to said scanner;
- a differential amplifier, responsive to said reference signals and control element output signals for providing an output motor operating signal;
- first switching means for selectively connecting the outputs of each of said control elements to an input of said differential amplifier;
- a plurality of motors, each mechanically connected to one of said control elements;
- second switching means for selectively connecting the output of said differential amplifier to each of said motors;
- and, control means for operating said detecting means, said voltage, source, and said first and second switching means according to a predetermined sequence.

21. An apparatus as specified in claim 20 wherein said means for supplying is comprised of a signal generator.

* * * * *